United States Patent
Herdrich et al.

(10) Patent No.: US 10,331,492 B2
(45) Date of Patent: *Jun. 25, 2019

(54) TECHNIQUES TO DYNAMICALLY ALLOCATE RESOURCES OF CONFIGURABLE COMPUTING RESOURCES

(71) Applicant: INTEL CORPORATION, Santa Clara, CA (US)

(72) Inventors: Andrew J. Herdrich, Hillsboro, OR (US); Kapil Sood, Hillsboro, OR (US); Nrupal R. Jani, Hillsboro, OR (US); David J. Harriman, Sacramento, CA (US); Mesut A. Ergin, Portland, OR (US); Scott P. Dubal, Beaverton, OR (US); Ravishankar Iyer, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/676,948

(22) Filed: Aug. 14, 2017

(65) Prior Publication Data

US 2018/0060136 A1 Mar. 1, 2018

Related U.S. Application Data

(63) Continuation of application No. 14/627,912, filed on Feb. 20, 2015, now Pat. No. 9,733,987.

(51) Int. Cl.
G06F 9/50 (2006.01)

(52) U.S. Cl.
CPC .................. *G06F 9/5077* (2013.01)

(58) Field of Classification Search
CPC ..... G06F 9/5038; G06F 3/1263; G06F 9/4881; G06F 9/5077
(Continued)

(56) References Cited

U.S. PATENT DOCUMENTS

| 6,381,682 B2 * | 4/2002 | Noel | G06F 9/5077 |
| | | | 718/104 |
| 6,651,125 B2 * | 11/2003 | Maergner | G06F 9/5027 |
| | | | 710/244 |

(Continued)

FOREIGN PATENT DOCUMENTS

| CN | 103106043 A | 5/2013 |
| CN | 101414269 B | 11/2013 |
| CN | 103383655 A | 11/2013 |

OTHER PUBLICATIONS

Mirsky et al., "MATRIX: A Reconfigurable Computing Architecture with Configurable Instruction Distribution and Deployable Resources", IEEE, 1996 (Year: 1996).*

(Continued)

*Primary Examiner* — Wei Y Zhen
*Assistant Examiner* — Junchun Wu

(57) ABSTRACT

Examples may include techniques to coordinate the sharing of resources among virtual elements, including service chains, supported by a shared pool of configurable computing resources based on relative priority among the virtual element and service chains. Information including indications of the performance of the service chains and also the relative priority of the service chains may be received. The resource allocation of portions of the shared pool of configurable computing resources supporting the service chains can be adjusted based on the received performance and priority information.

20 Claims, 10 Drawing Sheets

(58) Field of Classification Search
USPC .......................................................... 718/103
See application file for complete search history.

(56) References Cited

U.S. PATENT DOCUMENTS

| | | | | |
|---|---|---|---|---|
| 7,051,188 | B1* | 5/2006 | Kubala | G06F 9/30003 718/104 |
| 7,350,195 | B2* | 3/2008 | Herbeck | G06F 11/3409 717/127 |
| 8,307,362 | B1* | 11/2012 | Gong | G06F 9/5077 718/104 |
| 8,799,902 | B2* | 8/2014 | Illikkal | G06F 9/5077 718/105 |
| 2002/0016891 | A1* | 2/2002 | Noel | G06F 9/5077 718/1 |
| 2007/0198982 | A1* | 8/2007 | Bolan | G06F 9/5016 718/104 |
| 2008/0250415 | A1* | 10/2008 | Illikkal | G06F 9/5077 718/103 |
| 2009/0199177 | A1* | 8/2009 | Edwards | G06F 9/5077 718/1 |
| 2011/0022812 | A1* | 1/2011 | van der Linden | G06F 9/5077 711/163 |
| 2012/0054763 | A1* | 3/2012 | Srinivasan | G06F 9/5005 718/104 |
| 2013/0007757 | A1* | 1/2013 | Chambliss | G06F 9/46 718/103 |
| 2013/0185433 | A1* | 7/2013 | Zhu | H04L 67/303 709/226 |
| 2014/0280966 | A1* | 9/2014 | Sapuram | G06Q 30/0631 709/226 |
| 2015/0058857 | A1* | 2/2015 | Sandstrom | G06F 9/5038 718/103 |
| 2015/0112915 | A1* | 4/2015 | Michael | G06N 5/04 706/46 |
| 2015/0268990 | A1* | 9/2015 | Greene | G06F 9/4843 718/104 |
| 2017/0206116 | A1* | 7/2017 | Reque | G06F 9/445 |

OTHER PUBLICATIONS

Hussain et al., "A survey on resource allocation in high performance distributed computing systems", Elsevier, 2013 (Year: 2013).*

Kim et al., "Dynamically mapping tasks with priorities and multiple deadlines in a heterogeneous environment", Elsevier, 2006 (Year : 2006).*

Gouda et al., "Priority based resource allocation model for cloud computing", International Journal of Science, Engineering and Technology Research, Jan. 2013, vol. 2, Issue 1 (Year: 2013).*

* cited by examiner

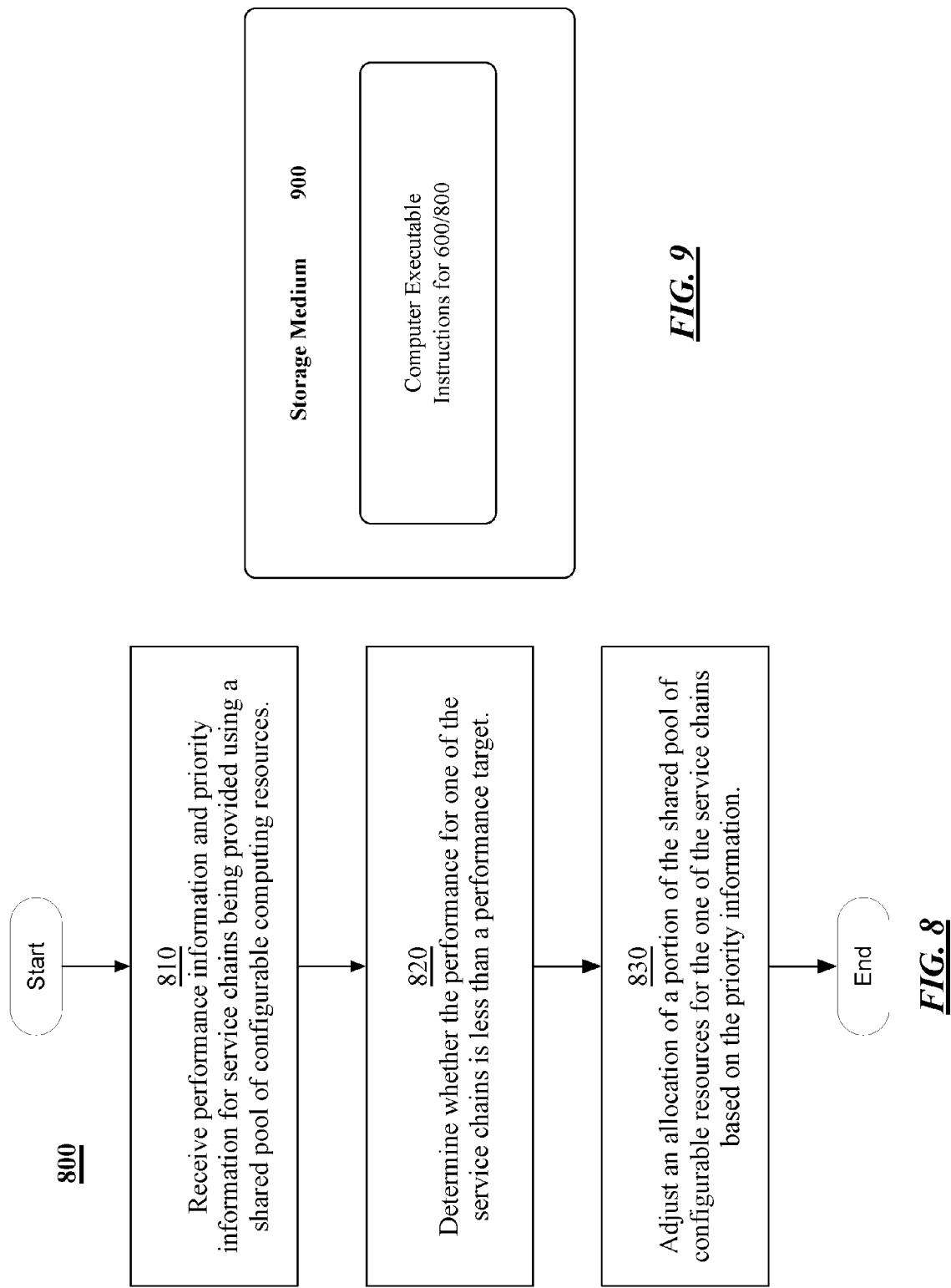

TECHNIQUES TO DYNAMICALLY ALLOCATE RESOURCES OF CONFIGURABLE COMPUTING RESOURCES

CROSS-REFERENCE TO RELATED APPLICATION

This application is a continuation of, claims the benefit of, and claims priority to U.S. patent application Ser. No. 14/627,912 filed on Feb. 20, 2015, the subject matter of which is incorporated herein by reference in its entirety.

TECHNICAL FIELD

Examples described herein are generally related to configurable computing resources and particularly to managing the sharing of such configurable computing resources.

BACKGROUND

Software defined infrastructure (SDI) is a technological advancement that enables new ways to operate a shared pool of configurable computing resources deployed for use in a data center or as part of a cloud infrastructure. SDI may allow individual elements of a system of configurable computing resources to be composed with software. These elements may include disaggregate physical elements such as CPUs, memory, network input/output devices or storage devises. The elements may also include composed elements that may include various quantities or combinations of physical elements composed to form logical servers that may then support virtual elements arranged to implement various services or workloads.

These various workloads are deployed, using the shared pool of configurable resources (e.g., at a data center, or the like). In modern data centers, many different workloads (possible from different customers, relating to different projects, or the like) are consolidated to operate on a single virtual server or a grouping of configurable computing resources. Due to the varied nature of the workloads operating within the SDI, some workloads can over-consume resources from the shared pool. For example, some workloads may over-consume cache space (e.g., L3 cache), memory bandwidth, etc. This over consumption of resources by some workloads may result in a bottleneck to other workloads.

BRIEF DESCRIPTION OF THE DRAWINGS

FIG. 8 illustrates an example logic flow.
FIG. 9 illustrates an example of a storage medium.

DETAILED DESCRIPTION

As contemplated in the present disclosure, various workloads can be executed using a shared pool of configurable resources, such as, computing-resources of a data center. These workloads can be implemented using SDI, Software Defined Network (SDN), or other virtualization techniques.

In general, the present disclosure provides processes and apparatuses to manage resource allocation for these various workloads. For example, the present disclosure provides a controller configured to allocate resources per workload on a fine-grained basis. The present disclosure may allocate cache space (e.g., L3 cache, or the like), memory bandwidth, and/or input and output (I/O) bandwidth to various workloads. With some examples, the controller may allocate such resources based on performance goals and relative priority of the workloads. Such performance goals and/or workload priority can be specified, for example, by a service level agreement (SLA), or the like.

The present disclosure provides management and allocation of shared computing resources at a "fine-grained" level as compared to present techniques. As such, the present disclosure may enable higher consolidation density of workloads, better management of resources to meet performance goals, and better management on a per workload (e.g., process flow, VM, VNF, container, etc.) basis. In particular, the present disclosure provides management or resource allocation on a per workload basis as opposed to limiting the number of workloads per platform, or limiting resource usage per workload.

With some examples, a controller can be configured to allocate resources, adjust a resource allocation, rebalance resource allocations, and/or migrate service chains to another server or portion of configurable computing resources. The controller may be configured to receive a policy to include indications of performance target and priority classification for a number of service chains. The controller may also be configured to receive performance information to include indications of the performance of the service chains and to adjust resource allocation based on the received policy, performance information, and the relative priority between the service chains.

Figure 1:
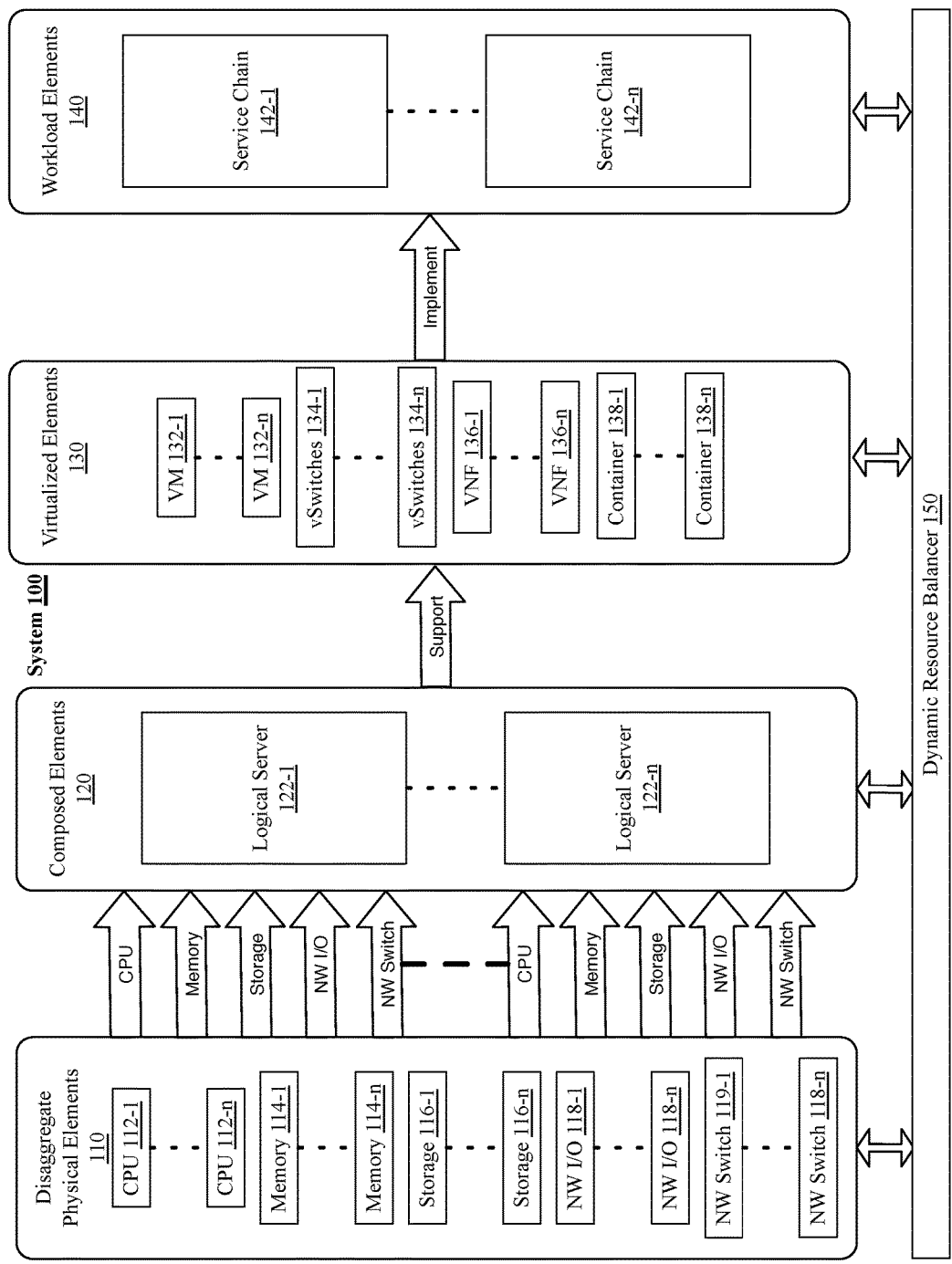
FIG. 1 illustrates an example first system.

FIG. 1 illustrates an example first system 100. In some examples, system 100 includes disaggregate physical elements 110, composed elements 120, virtualized elements 130, service chains 140, and dynamic resource balancer (DRB) 150. In some examples, DRB 150 may be arranged to manage or control at least some aspects of disaggregate physical elements 110, composed elements 120, virtualized elements 130 and service chains 140. In general, the DRB 150 provides for the sharing of the disaggregate physical elements 110 and composed elements 120 by the virtualized elements 130 and the service chains 140 based on the relative priority of the virtualized elements 130 and service chains 140. For example, the DRB 150 may be configured to coordinate the sharing of resources in the system 100 (e.g., cache space, memory bandwidth, I/O bandwidth, or the like) between various ones of the virtualized elements 130 and/or service chains 140 based on the relative priority of these elements.

It is important to note, the DRB 150 can be configured to coordinate the sharing of resources among any workload supported by the pool of configurable resources represented by the system 100. For example, the DRB 150 can coordinate the sharing of resources between the virtualized elements 130, the service chains 140, or any combination of these "workload elements." Although many examples presented herein use the service chains 140, and particularly network virtualized functions (NVFs) as examples, this is not to be limiting.

According to some examples, as shown in FIG. 1, disaggregate physical elements 110 may include CPUs 112-1 to 112-n, where "n" is any positive integer greater than 1. CPUs 112-1 to 112-n may individually represent single microprocessors or may represent separate cores of a multi-core microprocessor. Disaggregate physical elements 110 may also include memory 114-1 to 114-$n$. Memory 114-1 to 114-$n$ may represent various types of memory devices such as, but not limited to, dynamic random access memory (DRAM) devices that may be included in dual in-line memory modules (DIMMs) or other configurations. Disaggregate physical elements 110 may also include storage 116-1 to 116-$n$. Storage 116-1 to 116-$n$ may represent various types of storage devices such as hard disk drives or solid state drives. Disaggregate physical elements 110 may also include network (NW) input/outputs (I/Os) 118-1 to 118-$n$. NW I/Os 118-1 to 118-$n$ may include network interface cards (NICs) having one or more NW ports w/associated media access control (MAC) functionality for network connections within system 100 or external to system 100. Disaggregate physical elements 110 may also include NW switches 119-1 to 119-$n$. NW switches 119-1 to 119-$n$ may be capable of routing data via either internal or external network links for elements of system 100.

In some examples, as shown in FIG. 1, composed elements 120 may include logical servers 122-1 to 122-$n$. For these examples, groupings of CPU, memory, storage, NW I/O or NW switch elements from disaggregate physical elements 110 may be composed to form logical servers 122-1 to 122-$n$. Each logical server may include any number or combination of CPU, memory, storage, NW I/O or NW switch elements.

According to some examples, as shown in FIG. 1, virtualized elements 130 may include a number of virtual machines (VMs) 132-1 to 132-$n$, virtual switches (vSwitches) 134-1 to 134-$n$, virtual network functions (VNFs) 136-1 to 136-$n$, or containers 138-1 to 138-$n$. It is to be appreciated, that the virtual elements 130 can be configured to implement a variety of different functions and/or execute a variety of different applications. For example, the VMs 132-$a$ can be any of a variety of virtual machines configured to operate or behave as a particular machine and may execute an individual operating system as part of the VM. The VNFs 136-$a$ can be any of a variety of network functions, such as, packet inspection, intrusion detection, accelerators, or the like. The containers 138-$a$ can be configured to execute or conduct a variety of applications or operations, such as, for example, email processing, web servicing, application processing, data processing, or the like.

In some examples, virtualized elements 130 may be arranged to form service chains 140, also referred to as workloads or process flows. For example, service chains 140-1 and 140-2 (refer to FIG. 3-4) may include VNFs 136-1 to 136-3 and 136-4 to 136-6. Additionally, the individual virtual elements of a service chain can be connected by vSwitches 134-$a$. Furthermore, in some examples, each of the virtualized elements 130 for any number of service chains 140 may be supported by a given logical server from among logical servers 122-1 to 122-$n$ of composed elements 120. For example, logical server 122-1 (refer to FIGS. 2-4) can be formed from disaggregate physical elements such as CPU 112-1 having cache (e.g., 113-1), memory 114-1, and NW I/O 18-1. Accordingly, each of the service chains supported by the logical server 122-1 can be configured to operate using a portion of the computing resources (e.g., CPU 112-1, memory 114-1, NW I/O 118-1, etc.) of the logical server 122-1. Said differently, a portion of the computing resources of the logical server 122-1 can be allocated for each of the service chains 140 supported by the logical server 122-1.

The DRB 150 can be configured to receive performance information for the workload elements (e.g., service chains 140, virtualized elements 130, etc.) supported by the system 100 and coordinate the sharing of resources between these workload elements. For example, the DRB 150 can be configured to allocate (or adjust an allocation) of a portion of the shared pool of configurable resources (e.g., the disaggregate physical elements 110) for any number of the workload elements. Additionally, the DRB 150 can be configured to relocate workload elements from one logical server to another.

It is important to note, that the DRB 150 can be configured to coordinate this sharing of resources based on performance information to include indications of the performance of the workload elements and an indication of the relative priority between the workload elements. Examples of this are provided in greater detail below. However, it is worthy to note, that the DRB 150 can further be configured to coordinate sharing based on increasing throughput, decreasing latency, or the like. As such, the coordination of resource sharing described herein can lead to an increase in data center performance and additionally can lead to an increase in density of workload elements without sacrificing performance.

Figure 2:
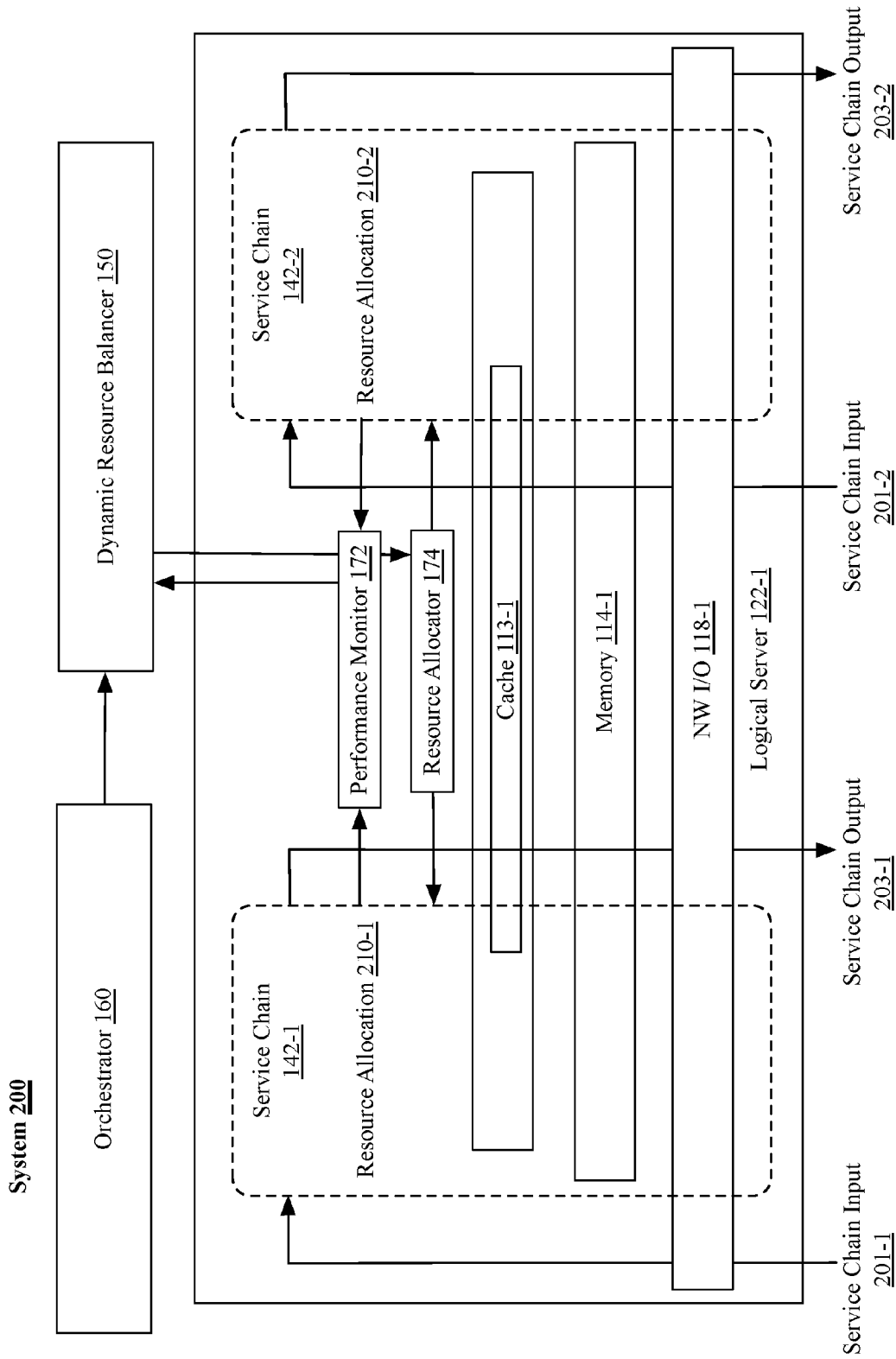
FIGS. 2-4 illustrate portions of an example second system.
Figure 3:
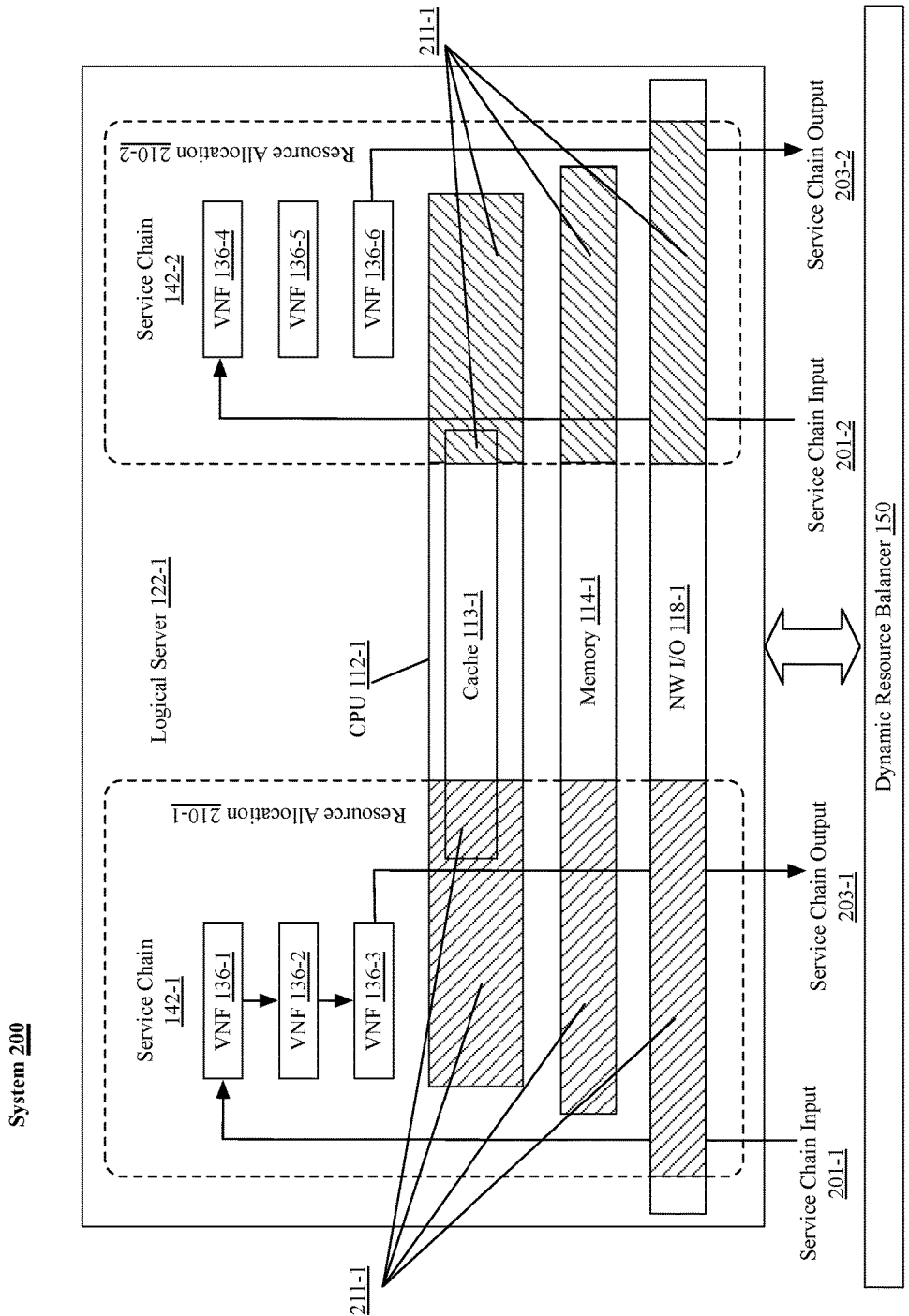
Figure 4:
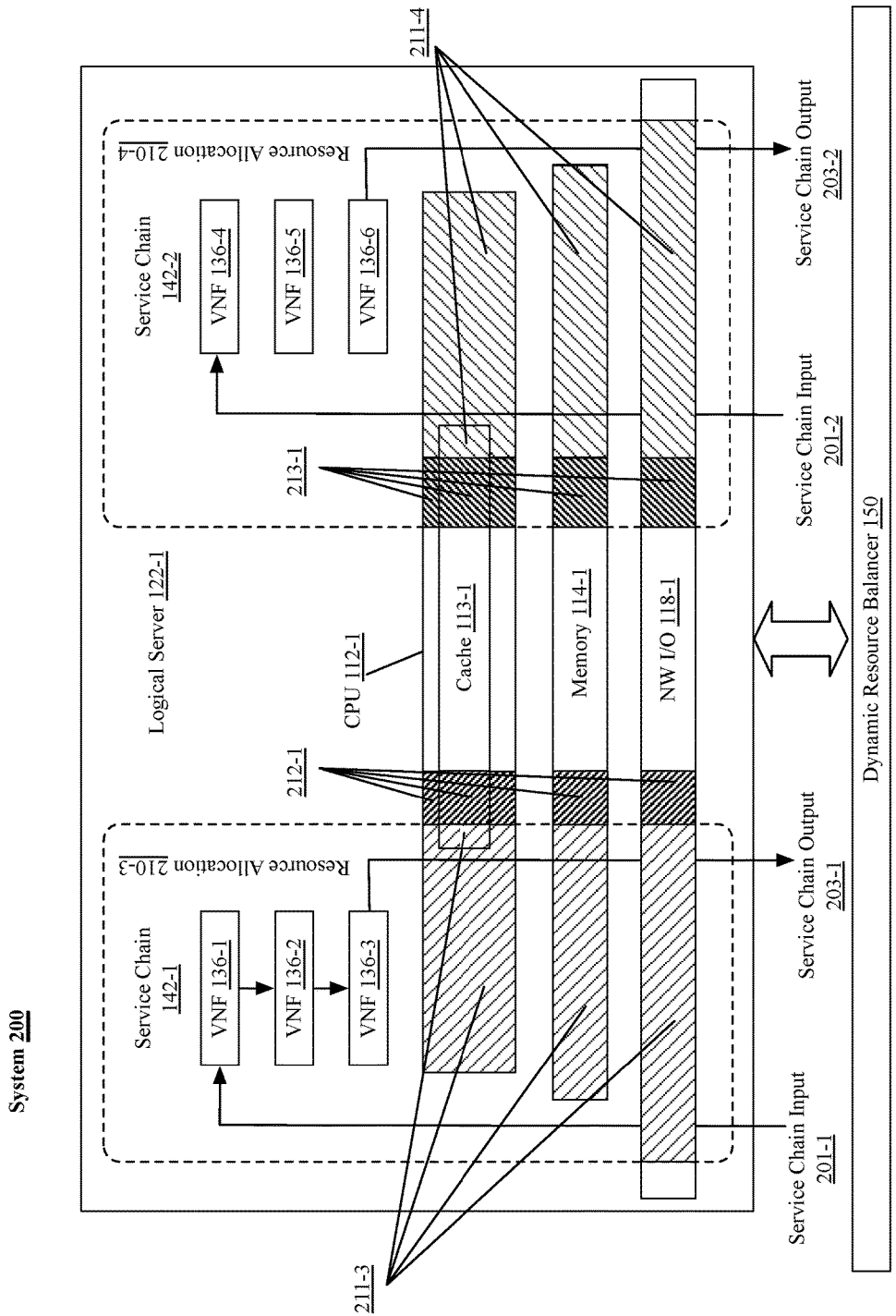

FIGS. 2-4 illustrate an example second system 200. It is important to note, that the example second system 200 is described with reference to portions of the example system 100 shown in FIG. 1. This is done for purposes of conciseness and clarity. However, the example system 200 can be implemented with different elements than those discussed above with respect to the system 100. As such, the reference to FIG. 1 is not to be limiting. In general, these figures show the system 200 comprising the local service chains 142-1 and 142-2 each having a resource allocation 210-$a$. The resource allocations 210 correspond to the portion of resources of the logical server 122-1 that the corresponding service chain is allocated to use. In particular, FIG. 2 shows the system 200 including performance monitoring and resource allocation components to monitor the performance of the workload elements and allocate resources as directed by the DRB 150. FIGS. 3-4 are described in greater detail below to illustrate example operation of the system 200.

Turning more specifically to FIG. 2, service chains 142-1 and 142-2 are depicted supported by the logical server 122-1, and particularly, the resources (e.g., disaggregate physical elements 110) of the logical server 122-1. Furthermore, service chain inputs 201-$a$ and service chain outputs 203-$a$ showing data paths through the service chains 142-$a$ are depicted. It is important to note, that although the examples provided here show a limited number of workload elements (e.g., service chains 142-1 and 142-2) supported by logical server 122-1, this is not to be limiting. More specifically, the present disclose can be applied to coordinating the sharing of resources between any number of workload elements. In practice, the number of workload element can exceed thousands of service chains, and/or virtualized elements supported by a single logical server. Furthermore, the DRB 150 may be configured to coordinate the sharing of resources across an entire data center (e.g., as show in FIG. 1) that may include multiple logical servers. An example of this is discussed in greater detail below in conjunction with FIG. 5. However, for purposes of clarity and conciseness only, FIGS. 2-4 show only the logical server 122-1 and the service chains 142-1 and 142-2.

Each service chain 142-$a$ is depicted having a resource allocation 210-$a$. The resource allocations 210-$a$ correspond to disaggregate physical elements 110 used to implement the logical server 122-1 that the corresponding service chain 142-a is allocated to use. More particularly, resource allocation 210-1 corresponds to the portion of disaggregate physical elements 110 used to implement the service chain 142-1 while resource allocation 210-2 corresponds to the portion of disaggregate physical elements 110 used to implement the service chain 142-2. For example, resource allocation 210-1 is shown including a first portion of CPU 112-1, Cache 113-1, Memory 114-1, and N/W IO 118-1 and resource allocation 210-2 is shown including a second portion of CPU 112-1, Cache 113-1, Memory 114-1, and N/W IO 118-1.

The system 100 further includes a performance monitor component 172 and a resource allocator component 174. The components 172 and 174 can be implemented by software, hardware, or some combination of the two. For example, the components 172 and 174 can be implemented using a combination of software and hardware that utilizes hooks (e.g., API's, interrupts, register writes, or the like) that allow for the monitoring and allocation of resources at each of the disaggregate physical elements 110. As a particular example, the CPU 112-1 can include a register accessed using a Write to Model Specific Register (WRMSR) instruction that allows for monitoring of the usage of the cache 113-1 by each of the service chains 142-1 and 142-2 and also to allocate the portion of the cache 113-1 that each of the service chains 142-1 and 142-2 can use. For example, with some embodiments, the performance monitor component 172 and the resource allocator component 174 can be implemented using the Intel® Resource Director Technology® (RDT).

The DRB 150 is operably coupled to the component 172 and 174. Furthermore, the DRB 150 can be operably coupled to an orchestrator 160. In general, the orchestrator 160 is configured to implement policies and manage the overall system 200 and more particularly the cloud infrastructure in which the logical server 122-1 is implemented. The orchestrator 160 may include or be configured with information to include indications of policies and the relative priority or a priority class for each of the service chains 142-1 and 142-2. Such policies can correspond to service level agreements (SLAs) or the like for the workload elements and/or customers of the system 200. The information including the indications of the policy and priority can be communicated to the DRB 150.

It is important to note, that the policy information, including the indication of the priority of the service chains, can be updated during operation (e.g., after the service chains are provisioned and implemented in the system 200, or the like). The orchestrator 160 can update the DRB 150 including communicating information to include indications of the updated policy and/or priority information. As such, the resource allocations can be dynamically updated to account for the updated policy.

During operation, the DRB 150 may receive performance information from the performance monitor component 172. In general, the performance information can be any of a variety of metrics that indicate performance, such as, for example, queue depth of a buffer, the number of threads waiting to be executed, cache misses, CPU utilization, memory utilization, network I/O, or the like. It is important to note, that the performance monitor 172 may be configured to monitor the performance for each service chain 142-a and/or each resource allocation 210-a.

The DRB 150 may determine an appropriate resource allocation, adjustment to resource allocation, or determine to migrate ones of the service chains 142-a based on the received policy/priority information and the received performance information. The DRB 150 can communicate with the resource allocator component 174 to cause the resource allocator component 174 to modify the resource allocations 210-a accordingly. For example, the DRB 150 can communicate a control signal or send an instruction (e.g., an WRMSR instruction, or the like) to the resource allocator component 174 to cause the resource allocator component 174 to make adjustments to the resource allocations 210-a.

In particular, the DRB 150 can be configured to determine adjustments to make to the allocation of resources, including migrating service chains to a less crowded logical server based on priority information to satisfy the SLAs. Examples of this are described in greater detail below. For example, FIGS. 3-4 depict the service chains 142-1 and 142-2 supported by logical server 122-1. In particular, FIG. 3 depicts the service chains 142-1 and 142-2 each having a first resource allocation while FIG. 4 depicts the service chains 142-1 and 142-2 each having a second resource allocation, which is different than the first resource allocation.

Turning more specifically to FIG. 3, the service chain 142-1 is depicted including VNFs 136-1 to 136-3 and the service chain 142-2 is depicted including VNFs 136-4 to 136-6. Additionally, portions of the resources supporting the logical server 122-1 corresponding to each of the resource allocations 210-a are identified. In particular, the resource allocation 210-1 including the portion of resources 211-1 (e.g., the portion of CPU 112-1, Cache 113-1, Memory 114-1, and NW I/O 118-1) usable by the service chain 142-1 and particularly, the VNFs 136-1 to 136-3 is depicted. Additionally, the resource allocation 210-2 including the portion of resources 211-2 usable by the service chain 142-2 and particularly, the VNFs 136-4 to 136-6 is depicted.

Turning more specifically, to FIG. 4, the service chain 142-1 is depicted having an updated resource allocation 210-3 including the portion of resources 211-3 usable by the service chain 142-1 and particularly, the VNFs 136-1 to 136-3. As depicted, the portion of resources 211-3 is less than the portion 211-1. In particular, a portion of resources 212-1 is shown, which corresponds to resources reclaimed from the resource allocation 210-1. In some examples, the DRB 150 may determine to reclaim resources from a service chain's resource allocation if the performing information and the priority information indicate that resources can be reclaimed without negatively impacting the policy and/or the SLA. As a specific example, if the available NW I/O bandwidth is 100 Gb/s in the resource allocation 210-1 and the performance information indicates that the utilized NW I/O bandwidth is 40 GB/s, then the DRB 150 may determine to reclaim some of the NW I/O bandwidth (e.g., 50 GB/s, or the like) to use for another service chain, or the like.

The service chain 142-2 is depicted having an updated resource allocation 210-4 including the portion of resources 211-4 usable by the service chain 142-2 and particularly, the VNFs 136-4 to 136-6. As depicted, the portion of resources 211-4 is greater than the portion 211-2. In particular, a portion of resources 213-1 is shown, which corresponds to resources added to the resource allocation 210-2. In some examples, the DRB 150 may determine to add resources to a service chain's resource allocation if the performance information and the priority information indicate that resources should be added to satisfy or meet the policy and/or the SLA. As a specific example, if the performance information indicates that the depth of thread execution queues corresponding to the service chain 142-2 are long the DRB 150 may determine to add Cache space 113-1 to the resource allocation to reduce the thread execution queue and possibly decrease latency.

As described above, the DRB 150 can be configured to rebalance or coordinate the allocation of resources based on priority of the service chains relative to each other. For example, assume the service chain 141-1 is lower priority than the service chain 142-2. As such, the DRB 150 may determine to modify the allocation of resources as shown in FIGS. 3-4 to increase the performance (e.g., latency based, throughput based, or the like) of the service chain 142-2 as it is higher priority than the service chain 142-1.

Figure 5:
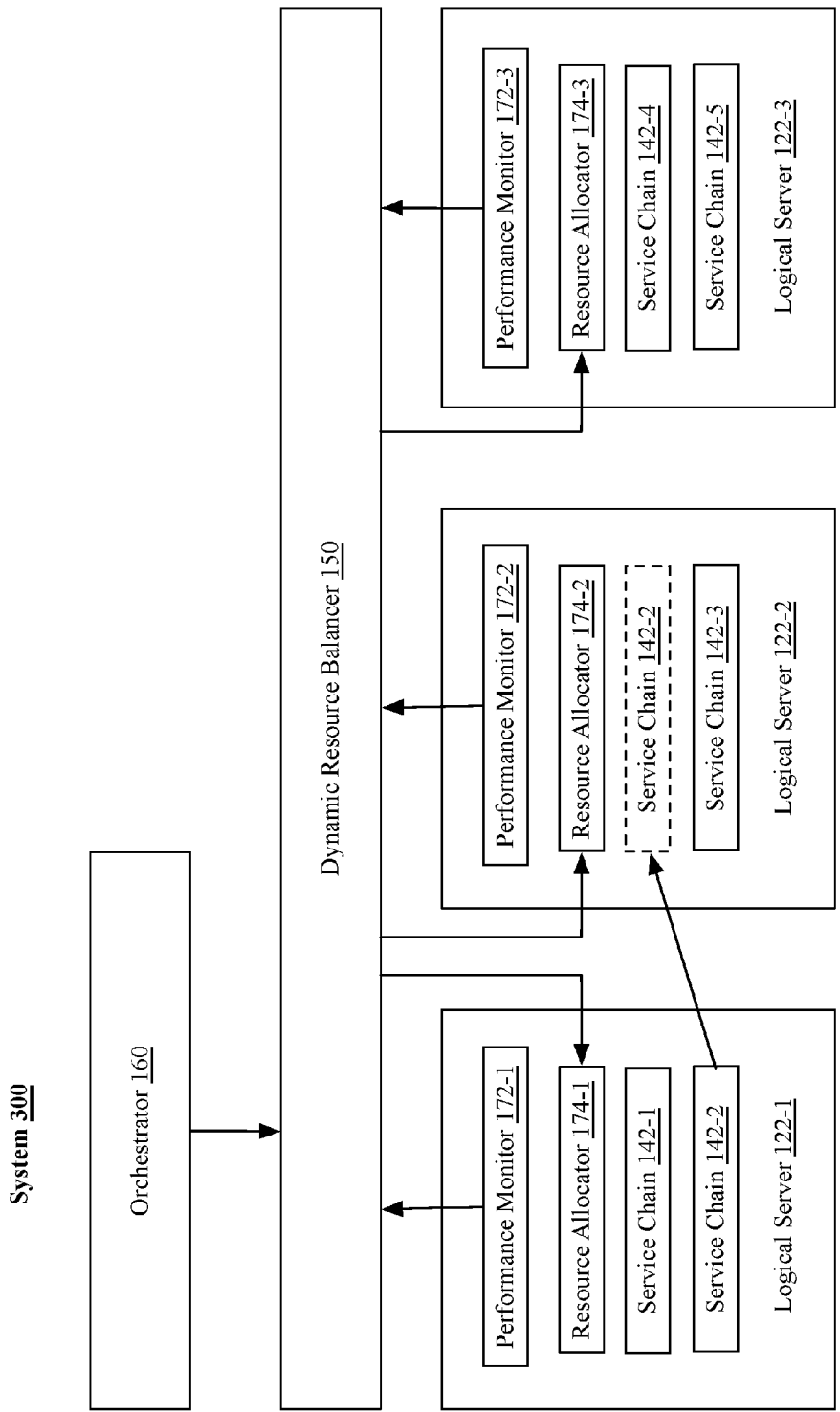
FIG. 5 illustrates an example third system.

FIG. 5 illustrates an example third system 300. It is important to note, that the example third system 300 is described with reference to portions of the example system 100 shown in FIG. 1 and also the example system 200 shown in FIGS. 2-4. However, the example system 300 can be implemented with different elements than those discussed above with respect to the systems 100 and 200. As such, references to FIGS. 1-4 are not to be limiting.

As depicted, the system 300 includes logical servers 122-1 to 122-3. Each logical server 122-a includes a performance monitor component 172-a and a resource allocation component 174-a. In particular, the logical server 122-1 includes the performance monitor component 172-1 and the resource allocation component 174-1, the logical server 122-2 includes the performance monitor component 172-2 and the resource allocation component 174-2, and the logical server 122-3 includes the performance monitor component 172-3 and the resource allocation component 174-3.

Furthermore, each of the logical servers 122-a are configured to support or implement a number of service chains 142-a. In particular, logical server 122-1 is configured to support service chain 142-1 and 142-2, logical server 122-2 is configured to support service chain 142-3, and logical server 122-3 is configured to support service chains 142-4 and 142-5.

Each of the components 172-a and 174-a are operably coupled the DRB 150. In particular, the DRB 150 is configured to receive performance information for the service chains and resources corresponding to each logical server 122-a and to coordinate the sharing of resources within each logical server 122-a. For example, the DRB 150 can coordinate the sharing of resources within each logical server 122-a as described above in conjunction with FIGS. 3-4.

Additionally, the DRB 150 can be configured to cause ones of the service chains 142-a to be migrated from one logical server 122-a to another. For example, the DRB 150 can determine that based on the received performance information form the components 172-1 to 172-3 and the policy and/or priority information received from the orchestrator 160, the service chain 142-2 should be migrated from the logical server 122-1 to the logical server 122-2.

Figure 6A:
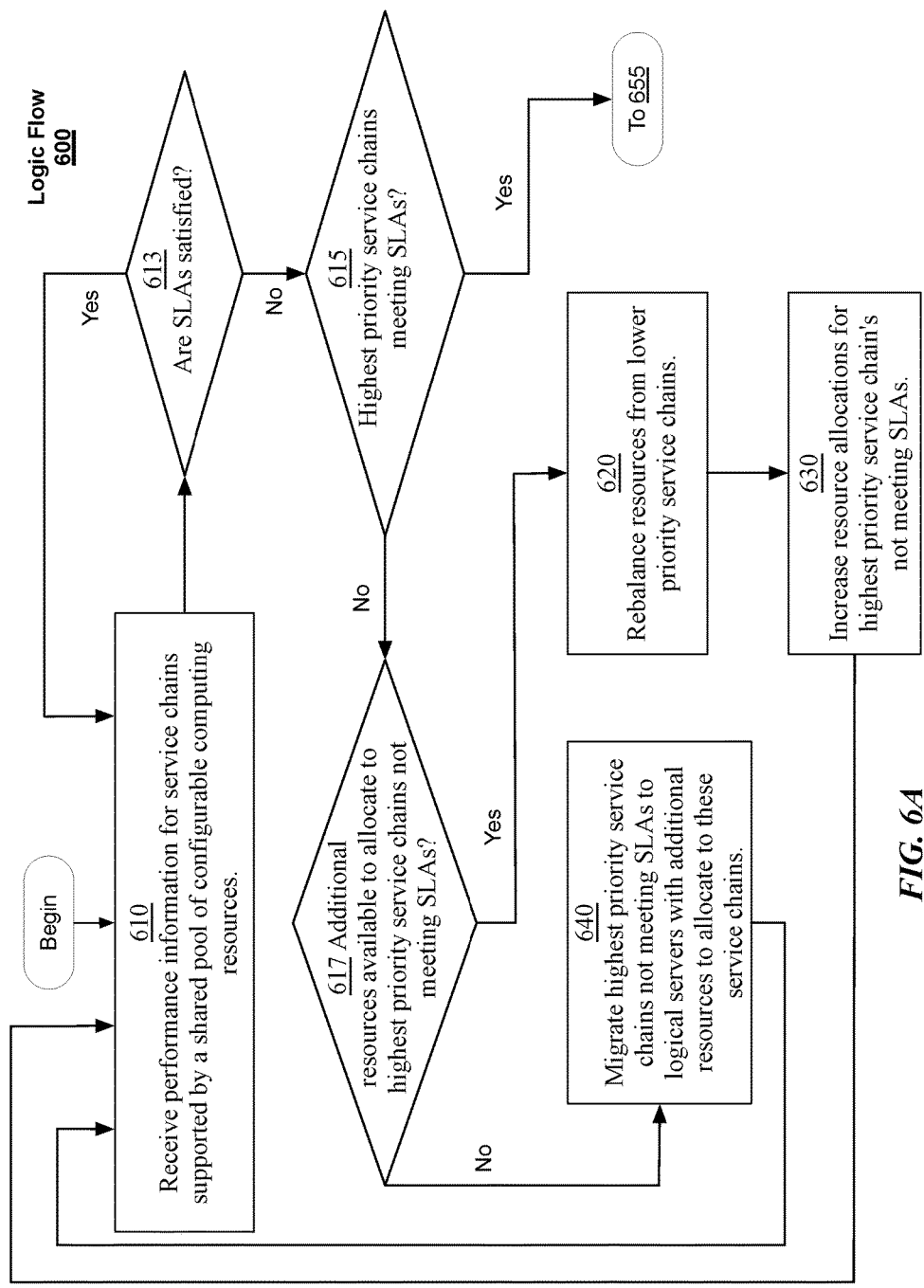
FIGS. 6A-6B illustrate an example logic flow.
Figure 6B:
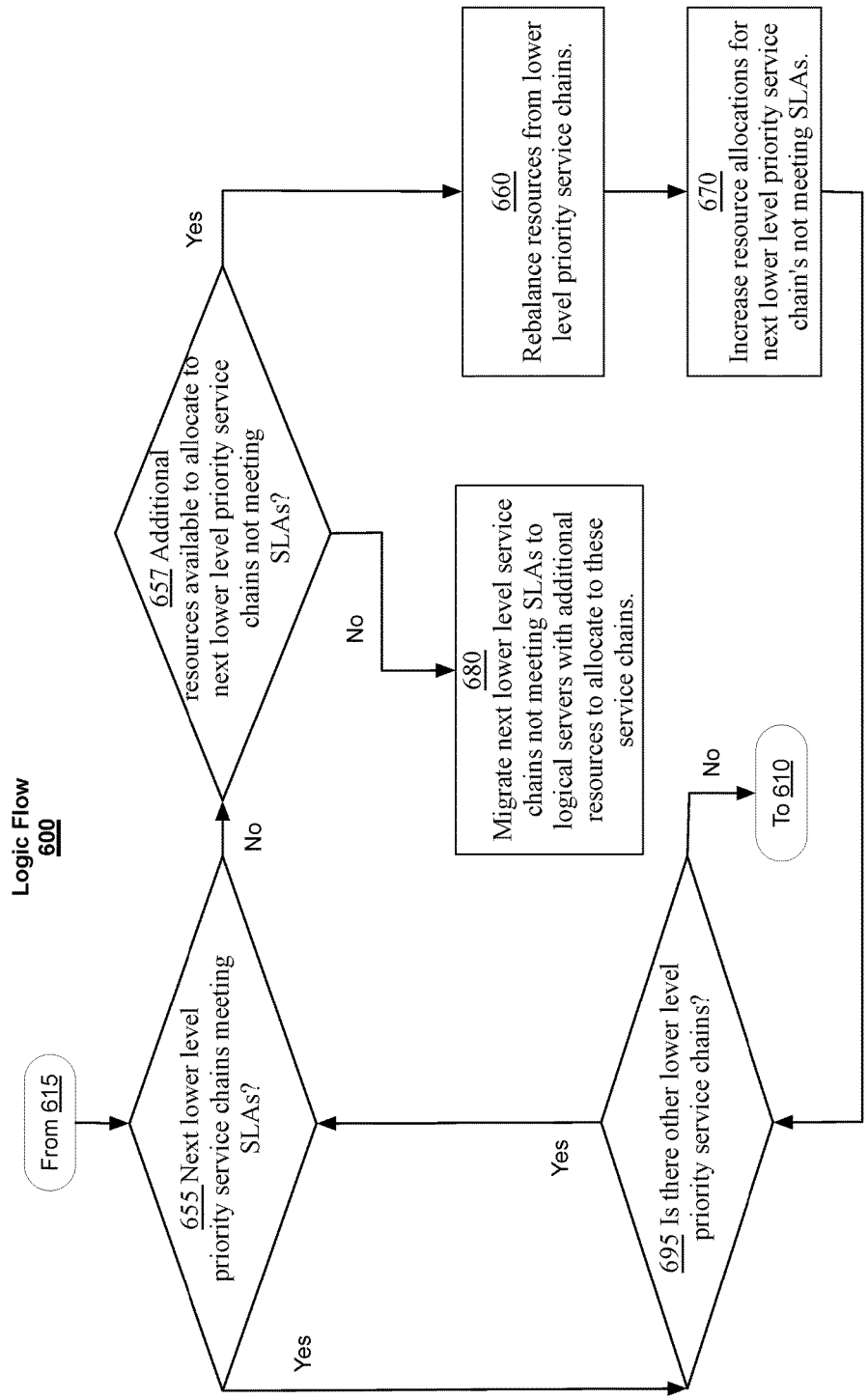

FIGS. 6A-6B illustrate an example logic flow 600 for coordinating resource allocation within a system including a shared pool of configurable resources, such as may be implemented by the DRB 150. In particular, the logic flow 600 may be implemented to coordinate the sharing of resources within the system 100, the system 200, and/or the system 300 as described herein. Specifically, the logic flow 600 can be implemented to provide a closed-loop performance management process, which accounts for SLAs and dynamically adjust resource allocations based on priority of service chains. It is important to note, that the priority can change during operation, as such, the logic flow 600 can be repeated to adjust the resource allocations to account for the change in priority.

Turning more particularly to FIG. 6A, the logic flow 600 may begin at block 610. At block 610, performance information corresponding to a number of service chains implemented in a system including a shared pool of configurable computing resources may be received. For example, the DBR 150 may receive performance information corresponding to the performance of the service chains 142-1 to 142-n. Continuing to decision block 613, a determination as to whether the received performance information indicates the service chains are meeting their performance goals or are meeting the performance metric specified in the SLAs corresponding to the service chains. If the performance dictated by the SLAs is being met, the logic flow 600 may return to block 610. That is, the logic flow may be repeated or performed iteratively to dynamically (e.g., repeatedly, periodically, continually, or the like) monitor the performance of service chains implemented in the system and adjust resource allocations accordingly.

If the received performance information indicates that the performance goals are not satisfied, the logic flow 600 may continue to block 615. At block 615, a determination is made as to whether the highest priority service chains are meeting their performance goals. In particular, as described above, ones of the service chains may have a higher priority than other ones of the service chains. More particularly, the performance of these service chains may be more "important" than other service chains. Such classification of each service chains priority relative to each other may be indicated in policy information as described above.

From block 615, the logic flow may continue to block 617 or block 655. If the determination is made that the highest priority service chains are meeting their performance goals at block 615, the logic flow 600 may continue to block 655, which is described in greater detail below. However, if the determination is made that the highest priority service chains are not meeting their performance goals at block 615, the logic flow 600 may continue to block 617. At block 617, a determination is made as to whether additional resources are available to allocate to the highest priority service chains that are not meeting their performance goals. If the determination is made that additional resources do exist, the logic flow 600 may continue to blocks 620 and 630. At block 620, the DRB 650 may cause the resources for ones of the logical server's 122-a in the system to be rebalanced. For example, resources may be reclaimed from lower priority service chains and/or from service chains where the performance information indicates include excess resources in their resource allocation. Continuing to block 630, the DRB 150 may increase the resource allocation for the highest priority service chains that are not meeting their SLAs.

However, if the determination is made that additional resources do not exist, the logic flow 600 may continue to block 640. At block 640, the highest priority service chains not meeting their SLAs may be migrated to logical servers with additional (e.g., sufficient, substantially enough, or the like) resources to support the service chains. From block 640, the logic flow may return to block 610.

As described above, the logic flow 600 may continue from block 615 to block 655. Turning more particularly to FIG. 6B, the logic flow 600 and particularly block 655 are shown. At block 655, a determination is made as to whether the next lower level priority of service chains are meeting their performance goals. From block 655, the logic flow 600 may continue to block 657 or block 695. If the determination is made that the next lower level priority service chains are meeting their performance goals at block 655, the logic flow 600 may continue to block 695, which is described in greater detail below. However, if the determination is made that the next lower level priority service chains are not meeting their performance goals at block 655, the logic flow 600 may continue to block 657. At block 657, a determination is made as to whether additional resources are available to allocate to the next lower level priority service chains that are not meeting their performance goals. If the determination is made that additional resources do exist, the logic flow 600 may continue to blocks 660 and 670. At block 660, the DRB 150 may cause the resources for ones of the logical server's 122-*a* in the system to be rebalanced. For example, resources may be reclaimed from lower priority service chains and/or from service chains where the performance information indicates the service chains include excess resources in their resource allocation. Continuing to block 670, the DRB 150 may increase the resource allocation for the next lower level priority service chains that are not meeting their SLAs.

However, if the determination at block 657 is made that additional resources do not exist, the logic flow 600 may continue to block 680. At block 680, the next lower level priority service chains not meeting their SLAs may be migrated to logical servers with additional (e.g., sufficient, substantially enough, or the like) resources to support these service chains. From block 680, the logic flow may return to block 610.

At block 695, a determination is made as to whether additional lower level priority service chains exist. It is to be appreciated; the present disclosure can be applied to coordinate the sharing of resources for multiple tiers or levels of priority for service chains. Accordingly, at block 695, a determination is made as to whether a lower tier or level of priority classification exists so that the logic flow 600 may iterate through the lower level priority service chains to coordinate their resource allocations as described herein. As such, from block 695, the logic flow 600 may return to either block 655 or block 610. If a determination is made that a lower level of priority service chains do exit, the logic flow may continue to block 655 where the resource allocation for such service chains may be adjusted. However, if it is determined that a lower level of priority service chains do not exist, then the logic flow may return to block 610 so that the performance and resource allocations can be monitored and adjusted again.

Figure 7:
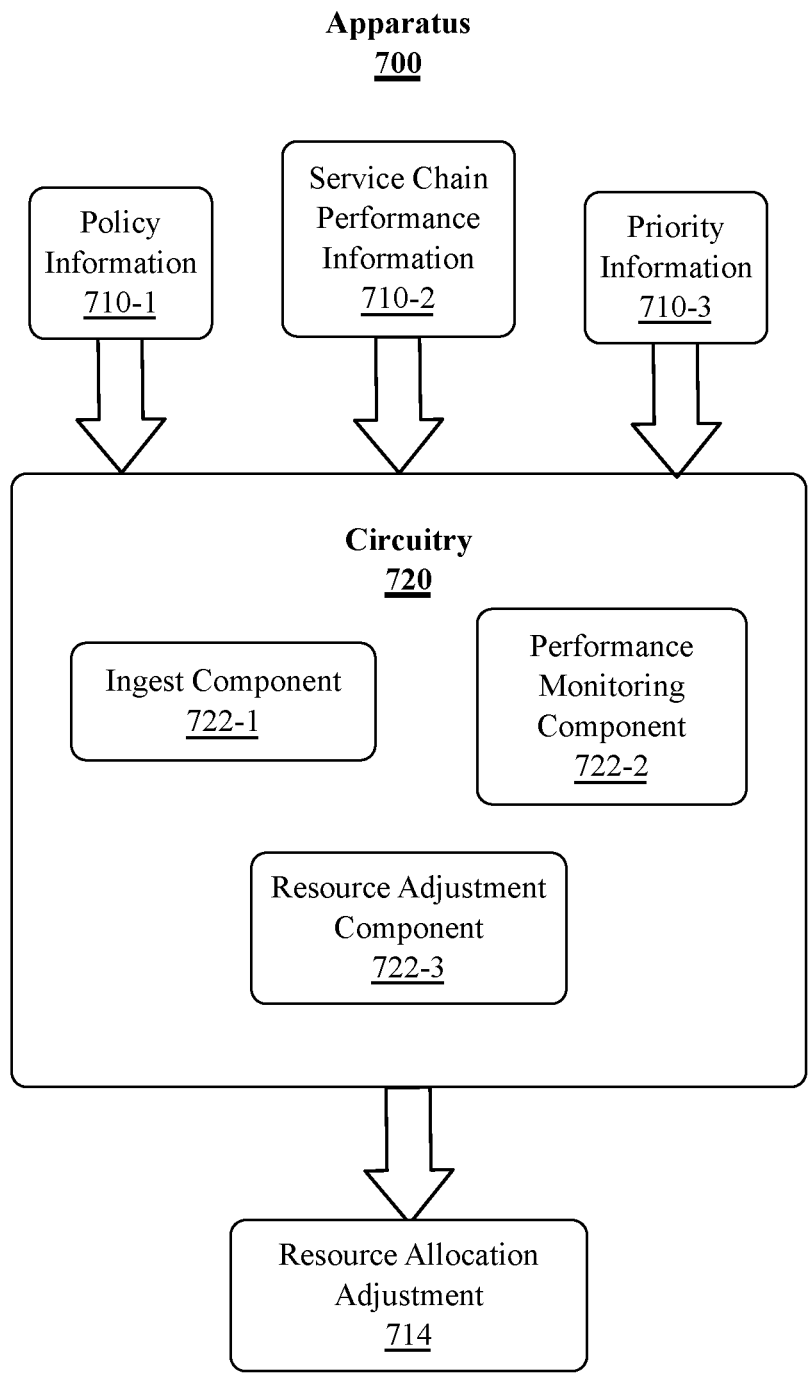
FIG. 7 illustrates an example block diagram for an apparatus.

FIG. 7 illustrates an example block diagram for apparatus 700. Although apparatus 700 shown in FIG. 7 has a limited number of elements in a certain topology, it may be appreciated that the apparatus 700 may include more or less elements in alternate topologies as desired for a given implementation.

According to some examples, apparatus 700 may be supported by circuitry 720 maintained at or with management elements for a system including a shared pool of configurable computing resources such as DRB 150 shown in FIGS. 1-5 for system 100, 200, and/or 300. Circuitry 720 may be arranged to execute one or more software or firmware implemented modules or components 722-*a*. It is worthy to note that "a" and "b" and "c" and similar designators as used herein are intended to be variables representing any positive integer. Thus, for example, if an implementation sets a value for a=3, then a complete set of software or firmware for components 722-*a* may include components 722-1, 722-2 or 722-3. The examples presented are not limited in this context and the different variables used throughout may represent the same or different integer values. Also, these "components" may be software/firmware stored in computer-readable media, and although the components are shown in FIG. 7 as discrete boxes, this does not limit these components to storage in distinct computer-readable media components (e.g., a separate memory, etc.).

According to some examples, circuitry 720 may include a processor, processor circuit or processor circuitry. Circuitry 720 may be part of host processor circuitry that supports a management element for cloud infrastructure such as DRB 150. Circuitry 720 may be generally arranged to execute one or more software components 722-*a*. Circuitry 720 may be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 720 may also include an application specific integrated circuit (ASIC) and at least some components 722-*a* may be implemented as hardware elements of the ASIC.

In some examples, apparatus 700 may include an ingest component 722-1. Ingest component 722-1 may be executed by circuitry 720 to receive information for a network service being provided using a shared pool of configurable computing resources, the network service including virtual elements and/or service chains. For these examples, information 710-*a* may include the received information. In particular, information 710-*a* may be policy information 710-1, service chain performance information 710-2, and/or priority information 710-3. The policy information 710-1 may include indications of performance targets for the service chains and may correspond to one or more SLAs for a customer of the data center. The service chain performance information 710-2 may include indications of the performance of each of the service chains and/or the configurable computing resources supporting each of the service chains. The priority information 710-3 may include indications of the relative priority between the service chains supported by the shared pool of configurable computing resources.

According to some examples, apparatus 700 may also include a performance monitoring component 722-2. Performance monitoring component 722-2 may be executed by circuitry 720 to determine whether ones of the service chains meet performance goals or metrics indicated by the policy information 710-1 based on the service chain performance information 710-2.

Apparatus 700 may also include a resource adjustment component 722-3. Resource adjustment component 722-3 may be executed by circuitry 720 to determine resource allocation adjustment 714. In particular, resource adjustment component 722-3 can determine an allocation or an adjustment to an allocation of resources supporting the service chains based on the determination of whether the service chains satisfy their policy goals and the priority information 710-3.

Various components of apparatus 700 and a device, node or logical server implementing apparatus 700 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 8 illustrates an example logic flow 800. Logic flow 800 may be representative of some or all of the operations executed by one or more logic, features, or devices described herein, such as apparatus 700. More particularly, logic flow 800 may be implemented by at least ingest component 722-1, performance monitoring component 722-2, or resource adjustment component 722-3.

According to some examples, logic flow 800 at block 810 may receive performance information and priority information for a number of service chains being provided using a shared pool of configurable computing resources, the performance information to include indications of performance of the service chains and the priority information to include an indication of a relative priority among the service chains. For example, the ingest component 722-1 may receive the policy information 710-1, the performance information 710-2, and/or the priority information 710-3.

In some examples, logic flow 800 at block 820 may determine whether the performance for one of the service chains is less than a performance target. For example, performance monitoring component 722-2 may determine whether the performance of the service chains is less than a performance target based on the policy information 710-1 and the performance information 710-2.

In some example, logic flow 800 at block 830 may adjust an allocation of a portion of the shared pool of configurable computing resources for the one of the service chains based on the determination that the performance for the one of the service chains is less than the performance target and based on the relative priority between the service chains. For example, resource adjustment component 722-3 may determine a resource allocation, determine an adjustment to make to a resource allocation, or determine to migrate, a service chain based on the performance of the service chain compared to the target performance and the priority of the service chain relative to the priority of the other service chains.

Furthermore, it is important to note, that the present disclosure may be implemented to adjust resource allocation for a service chain dynamically (e.g., during operation of the system implementing the service chain). Accordingly, logic flow 800 may be repeated (e.g., iteratively, periodically, or the like) to adjust the resource allocation based on repeatedly receiving performance information (e.g., at block 810) and/or priority information (which may update during operation) and repeatedly adjusting resource allocations (e.g., at block 830). As such, the DRB 150 can implement the logic flow 800 to optimize performance of logical servers 122-$a$ and particularly performance of service chains 142-$a$ supported by the logical servers to account for changing conditions (e.g. network data, computational requirements, adjusted priority, or the like).

FIG. 9 illustrates an example storage medium 900. As shown in FIG. 9, the storage medium includes a storage medium 900. The storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flow 600 and/or logic flow 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
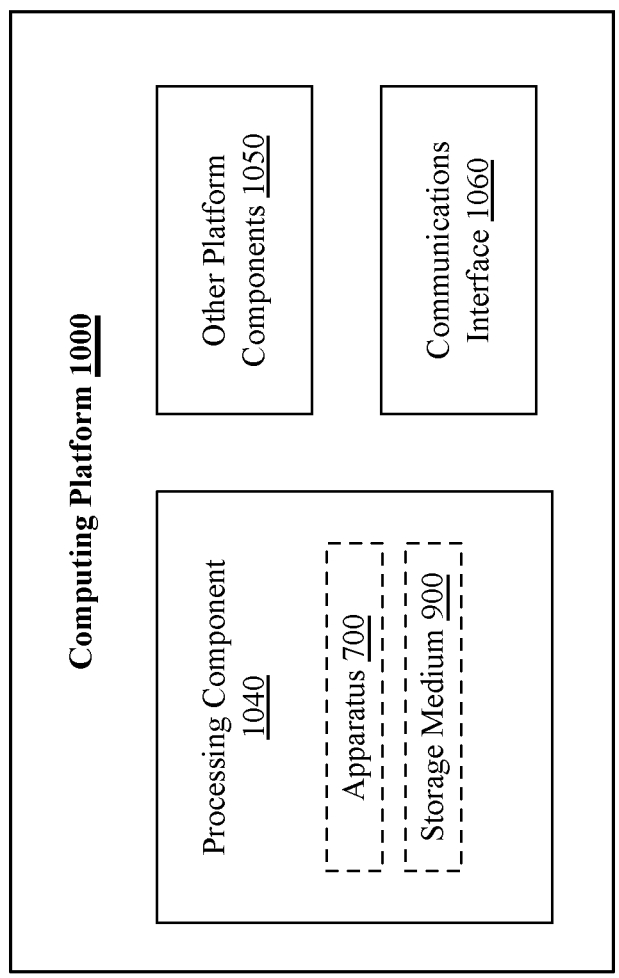
FIG. 10 illustrates an example computing platform.

FIG. 10 illustrates an example computing platform 1000. In some examples, as shown in FIG. 10, computing platform 1000 may include a processing component 1040, other platform components 1050 or a communications interface 1060. According to some examples, computing platform 1000 may host management elements (e.g., cloud infrastructure orchestrator, network data center service chain orchestrator, or the like) providing management functionality for a system having a shared pool of configurable computing resources such as system 100 of FIG. 1, system 200 of FIGS. 2-4, or system 300 of FIG. 5. Computing platform 1000 may either be a single physical server or a composed logical server that includes combinations of disaggregate components or elements composed from a shared pool of configurable computing resources.

According to some examples, processing component 1040 may execute processing operations or logic for apparatus 700 and/or storage medium 900. Processing component 1040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1050 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1060 may include logic and/or features to support a communication interface. For these examples, communications interface 1060 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification. Network communications may also occur according to the Infiniband Architecture specification or the TCP/IP protocol.

As mentioned above computing platform 1000 may be implemented in a single server or a logical server made up of composed disaggregate components or elements for a shared pool of configurable computing resources. Accordingly, functions and/or specific configurations of computing platform 1000 described herein, may be included or omitted in various embodiments of computing platform 1000, as suitably desired for a physical or logical server.

The components and features of computing platform 1000 may be implemented using any combination of discrete circuitry, application specific integrated circuits (ASICs), logic gates and/or single chip architectures. Further, the features of computing platform 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Example 1

An apparatus to optimize performance of a service chain, the apparatus comprising: circuitry; an ingest component for execution by the circuitry to receive performance information and priority information for a plurality of service chains to be provided using a shared pool of configurable computing resources, the performance information to include indications of performance of each of the plurality of service chains, the priority information to include an indication of a priority classification for each of the plurality of service chains; a performance monitoring component to determine whether the performance for one of the plurality of service chains is less than a performance target; and a resource adjustment component to adjust an allocation of a portion of the shared pool of configurable computing resources for the one of the plurality of service chains based on the determination that the performance for the one of the plurality of service chains is less than the performance target and based on the priority classification.

Example 2

The apparatus of example 1, the ingest component to receive policy information, the policy information to include an indication of the performance target.

Example 3

The apparatus of example 2, the ingest component to receive updated policy information, the updated policy information to include an indication of an update performance target.

Example 4

The apparatus of example 3, the performance monitoring component to determine whether the performance for the one of the plurality of service chains is less than the updated performance target and the resource adjustment component to adjust the allocation of the portion of the shared pool of configurable resources for the one of the plurality of service chains based on the determination that the performance for the one of the plurality of service chains is less than the updated performance target.

Example 5

The apparatus of example 1, the one of the plurality of service chains a first one and the performance target a first performance target, the performance monitoring component to determine whether the performance for a second one of the plurality of service chains is less than a second performance target and the resource adjustment component to adjust the allocation of the portion of the shared pool of configurable computing resources for the second one of the plurality of service chains based on the determination that the performance for the second one of the plurality of service chains is less than the second performance target.

Example 6

The apparatus of example 5, the performance monitoring component to determine whether the priority classification for the first service chain is greater than the priority classification for the second service chain and the resource adjustment component to adjust the allocation of the portion of the shared pool of configurable computing resources for the first one of the plurality of service chains based on the determination that the performance for the first one of the plurality of service chains is less than the first performance target and that the priority classification for the first service chain is greater than the priority classification for the second service chain.

Example 7

The apparatus of example 6, the resource adjustment component to reclaim resources from the portion of the shared pool of configurable resources for the second one of the plurality of service chains based on the determination that the performance for the second one of the plurality for service chains is greater than the second performance target.

Example 8

The apparatus of example 5, the performance monitoring component to determine whether the priority classification for the first service chain is greater than the priority classification for the second service chain and the resource adjustment component to determine whether the shared pool of configurable computing resources includes additional resources to allocate to the portion of the shared pool of configurable resources for the second one of the plurality of service chains based on the determination that the performance for the second one of the plurality of service chains is less than the second performance target and to migrate the second service chain to a different shared pool of configurable computing resources based on the determination that the priority classification for the first service chain is greater than the priority classification for the second service chain and the shared pool of configurable computing resources does not include additional resources to allocate to the portion of the shared pool of configurable resources for the second one of the plurality of service chains.

Example 9

The apparatus of example 1, the ingest component to receive the policy information from an orchestrator for a data center.

Example 10

The apparatus of any one of examples 1 to 9, the policy information comprising an indication of a service level agreement for a customer of the cloud infrastructure.

Example 11

The apparatus of example 10, the performance target comprising a network throughput, a memory throughput, or a thread execution queue depth.

Example 12

The apparatus of any one of examples 1 to 9, the received performance information comprising queue depth of an internal buffer, threads waiting to be executed, processor utilization, memory utilization, cache misses or data throughput.

Example 13

The apparatus of any one of examples 1 to 9, the plurality of service chains each comprising one or more virtual elements.

Example 14

The apparatus of example 13, the one or more virtual elements comprising virtual network functions, virtual machines, or containers.

Example 15

The apparatus of any one of examples 1 to 9, the shared pool of configurable computing resources comprising disaggregate physical elements including central processing units, memory devices, storage devices, network input/output devices or network switches.

Example 16

The apparatus of any one of examples 1 to 9, comprising a digital display coupled to the circuitry to present a user interface view.

Example 17

A method comprising: receiving performance information and priority information for a plurality of service chains to be provided using a shared pool of configurable computing resources, the performance information to include indications of performance of each of the plurality of service chains, the priority information to include an indication of a priority classification for each of the plurality of service chains; determining whether the performance for one of the plurality of service chains is less than a performance target; and adjusting an allocation of a portion of the shared pool of configurable computing resources for the one of the plurality of service chains based on the determination that the performance for the one of the plurality of service chains is less than the performance target and based on the priority classification.

Example 18

The method of example 17, the policy information to include an indication of the performance target.

Example 19

The method of example 18, comprising receiving updated policy information, the updated policy information to include an indication of an update performance target.

Example 20

The method of example 19, comprising: determining whether the performance for the one of the plurality of service chains is less than the updated performance target; and adjusting the allocation of the portion of the shared pool of configurable resources for the one of the plurality of service chains based on the determination that the performance for the one of the plurality of service chains is less than the updated performance target.

Example 21

The method of example 17, the one of the plurality of service chains a first one and the performance target a first performance target, the method comprising: determining whether the performance for a second one of the plurality of service chains is less than a second performance target; and adjusting the allocation of the portion of the shared pool of configurable computing resources for the second one of the plurality of service chains based on the determination that the performance for the second one of the plurality of service chains is less than the second performance target.

Example 22

The method of example 21, comprising: determining whether the priority classification for the first service chain is greater than the priority classification for the second service chain; and adjusting the allocation of the portion of the shared pool of configurable computing resources for the first one of the plurality of service chains based on the determination that the performance for the first one of the plurality of service chains is less than the first performance target and that the priority classification for the first service chain is greater than the priority classification for the second service chain.

Example 23

The method of example 22, comprising reclaiming resources from the portion of the shared pool of configurable resources for the second one of the plurality of service chains based on the determination that the performance for the second one of the plurality for service chains is greater than the second performance target.

Example 24

The method of example 21, comprising: determining whether the priority classification for the first service chain is greater than the priority classification for the second service chain; determining whether the shared pool of configurable computing resources includes additional resources to allocate to the portion of the shared pool of configurable resources for the second one of the plurality of service chains based on the determination that the performance for the second one of the plurality of service chains is less than the second performance target; and migrating the second service chain to a different shared pool of configurable computing resources based on the determination that the priority classification for the first service chain is greater than the priority classification for the second service chain and the shared pool of configurable computing resources does not include additional resources to allocate to the portion of the shared pool of configurable resources for the second one of the plurality of service chains.

Example 25

The method of example 17, comprising receiving the policy information from an orchestrator for a data center.

Example 26

The method of any one of examples 17 to 25, the policy information comprising an indication of a service level agreement for a customer of the cloud infrastructure.

Example 27

The method of example 10, the performance target comprising a network throughput, a memory throughput, or a thread execution queue depth.

Example 28

The method of any one of examples 17 to 25, the received performance information comprising queue depth of an internal buffer, threads waiting to be executed, processor utilization, memory utilization, cache misses or data throughput.

Example 29

The method of any one of examples 17 to 25, the plurality of service chains each comprising one or more virtual elements.

Example 30

The method of example 29, the one or more virtual elements comprising virtual network functions, virtual machines, or containers.

Example 31

The method of any one of examples 17 to 25, the shared pool of configurable computing resources comprising disaggregate physical elements including central processing units, memory devices, storage devices, network input/output devices or network switches.

Example 32

An apparatus comprising means for performing the methods of any one of examples 17 to 31.

Example 33

At least one machine readable medium comprising a plurality of instructions that in response to being executed by a system cause the system to: receive, at a processor circuit, performance information and priority information for a plurality of service chains to be provided using a shared pool of configurable computing resources, the performance information to include indications of performance of each of the plurality of service chains, the priority information to include an indication of a priority classification for each of the plurality of service chains; determining whether the performance for one of the plurality of service chains is less than a performance target; and adjusting an allocation of a portion of the shared pool of configurable computing resources for the one of the plurality of service chains based on the determination that the performance for the one of the plurality of service chains is less than the performance target and based on the priority classification.

Example 34

The at least one machine readable medium of example 33, the policy information to include an indication of the performance target.

Example 35

The at least one machine readable medium of example 33, the plurality of instructions causing the system to receive updated policy information, the updated policy information to include an indication of an update performance target.

Example 36

The at least one machine readable medium of example 35, the plurality of instructions causing the system to: determine whether the performance for the one of the plurality of service chains is less than the updated performance target; and adjust the allocation of the portion of the shared pool of configurable resources for the one of the plurality of service chains based on the determination that the performance for the one of the plurality of service chains is less than the updated performance target.

Example 37

The at least one machine readable medium of example 33, the one of the plurality of service chains a first one and the performance target a first performance target, the plurality of instructions causing the system to: determine whether the performance for a second one of the plurality of service chains is less than a second performance target; and adjust the allocation of the portion of the shared pool of configurable computing resources for the second one of the plurality of service chains based on the determination that the performance for the second one of the plurality of service chains is less than the second performance target.

Example 38

The at least one machine readable medium of example 37, the plurality of instructions causing the system to: determine whether the priority classification for the first service chain is greater than the priority classification for the second service chain; and adjust the allocation of the portion of the shared pool of configurable computing resources for the first one of the plurality of service chains based on the determination that the performance for the first one of the plurality of service chains is less than the first performance target and that the priority classification for the first service chain is greater than the priority classification for the second service chain.

Example 39

The at least one machine readable medium of example 38, the plurality of instructions causing the system to reclaim resources from the portion of the shared pool of configurable resources for the second one of the plurality of service chains based on the determination that the performance for the second one of the plurality for service chains is greater than the second performance target.

Example 40

The at least one machine readable medium of example 37, the plurality of instructions causing the system to: determine whether the priority classification for the first service chain is greater than the priority classification for the second service chain; determine whether the shared pool of configurable computing resources includes additional resources to allocate to the portion of the shared pool of configurable resources for the second one of the plurality of service chains based on the determination that the performance for the second one of the plurality of service chains is less than the second performance target; and migrate the second service chain to a different shared pool of configurable computing resources based on the determination that the priority classification for the first service chain is greater than the priority classification for the second service chain and the shared pool of configurable computing resources does not include additional resources to allocate to the portion of the shared pool of configurable resources for the second one of the plurality of service chains.

Example 41

The at least one machine readable medium of example 33, the plurality of instructions causing the system to receive the policy information from an orchestrator for a data center.

Example 42

The at least one machine readable medium of any one of examples 33 to 41, the policy information comprising an indication of a service level agreement for a customer of the cloud infrastructure.

Example 43

The at least one machine readable medium of example 42, the performance target comprising a network throughput, a memory throughput, or a thread execution queue depth.

Example 44

The at least one machine readable medium of any one of examples 33 to 41, the received performance information comprising queue depth of an internal buffer, threads waiting to be executed, processor utilization, memory utilization, cache misses or data throughput.

Example 45

The at least one machine readable medium of any one of examples 33 to 41, the plurality of service chains each comprising one or more virtual elements.

Example 46

The at least one machine readable medium of example 45, the one or more virtual elements comprising virtual network functions, virtual machines, or containers.

Example 47

The at least one machine readable medium of any one of examples 33 to 41, the shared pool of configurable computing resources comprising disaggregate physical elements including central processing units, memory devices, storage devices, network input/output devices or network switches.

What is claimed is:
1. An apparatus to provide a plurality of service chains, the apparatus comprising:
 circuitry, at least a portion of which is in hardware, the circuitry coupled to a shared pool of configurable computing resources, the shared pool of configurable computing resources to provide the plurality of service chains, the circuitry to:
  receive performance information for at least a first service chain and a second service chain of the plurality of service chains;
  receive a priority classification for each of the plurality of service chains;
  determine whether a performance for the first service chain is less than a first performance target based on the performance information;

determine whether a priority of the first service chain is greater than a priority of the second service chain based on the priority classification; and adjust an allocation of a portion of the shared pool of configurable computing resources for the first service chain based on the determination that the performance for the first service chain is less than the first performance target and that the priority of the first service chain is greater than a priority of the second service chain based on the priority classification.

2. The apparatus of claim 1, the circuitry to receive policy information, the policy information to include an indication of the first performance target.

3. The apparatus of claim 2, the circuitry to receive updated policy information, the updated policy information to include an indication of an updated first performance target.

4. The apparatus of claim 3, the circuitry to:
determine whether the performance for the first service chain is less than the updated first performance target, and
adjust the allocation of the portion of the shared pool of configurable resources for the first service chain based on the determination that the performance for the first service chain is less than the updated first performance target.

5. The apparatus of claim 1, the circuitry to reclaim resources from the portion of the shared pool of configurable resources for the second service chain based on a determination that a performance for the second service chain is greater than the second performance target.

6. The apparatus of claim 1, the circuitry to receive the policy information from an orchestrator for a data center.

7. The apparatus claim 1, the policy information comprising an indication of a service level agreement for a customer of a cloud infrastructure.

8. The apparatus of claim 7, the first performance target comprising a network throughput, a memory throughput, or a thread execution queue depth.

9. The apparatus of claim 1, the performance information comprising queue depth of an internal buffer, threads waiting to be executed, processor utilization, memory utilization, cache misses or data throughput.

10. The apparatus of claim 1, the plurality of service chains each comprising one or more virtual elements.

11. The apparatus of claim 10, the one or more virtual elements comprising virtual network functions, virtual machines, or containers.

12. The apparatus of claim 1, the shared pool of configurable computing resources comprising disaggregate physical elements including central processing units, memory devices, storage devices, network input/output devices or network switches.

13. The apparatus of claim 1, comprising a digital display coupled to the circuitry to present a user interface view.

14. At least one non-transitory machine readable medium comprising a plurality of instructions that in response to being executed by a system cause the system to:
receive, at a processor circuit coupled to a shared pool of configurable computing resources, the shared pool of configurable computing resources to provide a plurality of service chains, performance information for at least a first service chain and a second service chain of the plurality of service chains;
receive, at the processor circuit, a priority classification for each of the plurality of service chains;

determine whether a performance for the first service chain is less than a first performance target based on the performance information;

determine whether a priority of the first service chain is greater than a priority of the second service chain based on the priority classification; and adjust an allocation of a portion of the shared pool of configurable computing resources for the first service chain based on the determination that the performance for the first service chain is less than the first performance target and that the priority of the first service chain is greater than a priority of the second service chain based on the priority classification.

15. The at least one non-transitory machine readable medium of claim 14, the plurality of instructions causing the system to:
receive updated policy information, the updated policy information to include an indication of an updated first performance target;
determine whether the performance for the first service chain is less than the updated first performance target; and
adjust the allocation of the portion of the shared pool of configurable resources for the first service chain based on the determination that the performance for the first service chain is less than the updated first performance target.

16. The at least one non-transitory machine readable medium of claim 14, the plurality of instructions causing the system to:
determine whether a performance for the second service chain is less than a second performance target; and
adjust the allocation of the portion of the shared pool of configurable computing resources for the second service chain based on the determination that the performance for the second service chain is less than the second performance target.

17. The at least one non-transitory machine readable medium of claim 16, the plurality of instructions causing the system to:
determine whether the priority classification for the first service chain is greater than the priority classification for the second service chain;
determine whether the shared pool of configurable computing resources includes additional resources to allocate to the portion of the shared pool of configurable resources for the second service chain based on the determination that the performance for the second service chain is less than the second performance target; and
migrate the second service chain to a different shared pool of configurable computing resources based on the determination that the priority classification for the first service chain is greater than the priority classification for the second service chain and the shared pool of configurable computing resources does not include additional resources to allocate to the portion of the shared pool of configurable resources for the second service chain.

18. A method comprising:
receiving performance information for at least a first service chain and a second service chain of a plurality of service chains to be provided using a shared pool of configurable computing resources;
receiving a priority classification for each of the plurality of service chains;

determining whether a performance for the first service chain is less than a first performance target based on the performance information;

determining whether a priority of the first service chain is greater than a priority of the second service chain based on the priority classification; and adjusting an allocation of a portion of the shared pool of configurable computing resources for the first service chain based on the determination that the performance for the first service chain is less than the first performance target and that the priority of the first service chain is greater than a priority of the second service chain based on the priority classification.

19. The method of claim 18, further comprising:

determining whether a performance for the second service chain is less than a second performance target; and adjusting the allocation of the portion of the shared pool of configurable computing resources for the second service chain based on the determination that the performance for the second service chain is less than the second performance target.

20. The method of claim 19, comprising:

determining whether the priority classification for the first service chain is greater than the priority classification for the second service chain;

determining whether the shared pool of configurable computing resources includes additional resources to allocate to the portion of the shared pool of configurable resources for the second service chain based on the determination that the performance for the second service chain is less than the second performance target; and migrating the second service chain to a different shared pool of configurable computing resources based on the determination that the priority classification for the first service chain is greater than the priority classification for the second service chain and the shared pool of configurable computing resources does not include additional resources to allocate to the portion of the shared pool of configurable resources for the second service chain.

* * * * *